(12) United States Patent
Mathew et al.

(10) Patent No.: US 11,132,267 B1
(45) Date of Patent: Sep. 28, 2021

(54) ABILITY TO MAINTAIN RPO IN CLUSTERED ENVIRONMENT WITH FAILED NODES/DISKS

(71) Applicant: EMC IP Holding Company LLC, Hopkinton, MA (US)

(72) Inventors: George Mathew, Belmont, CA (US); Kalyan C. Gunda, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/930,675

(22) Filed: Jul. 16, 2020

(51) Int. Cl.
*G06F 11/00* (2006.01)
*G06F 11/14* (2006.01)

(52) U.S. Cl.
CPC ...... *G06F 11/1471* (2013.01); *G06F 11/1448* (2013.01); *G06F 11/1451* (2013.01); *G06F 2201/82* (2013.01)

(58) Field of Classification Search
CPC ............. G06F 11/1446; G06F 11/1448; G06F 11/1451; G06F 11/1458; G06F 11/1464; G06F 11/1471; G06F 11/1658
See application file for complete search history.

(56) References Cited

U.S. PATENT DOCUMENTS

| | | | |
|---|---|---|---|
| 9,898,369 B1 * | 2/2018 | Moghe | G06F 16/128 |
| 2020/0104202 A1 * | 4/2020 | Stupak | G06F 11/203 |
| 2021/0096962 A1 * | 4/2021 | Yang | G06F 11/1448 |

* cited by examiner

*Primary Examiner* — Michael Maskulinski
(74) *Attorney, Agent, or Firm* — Womble Bond Dickinson (US) LLP

(57) ABSTRACT

A method for maintaining a replica of a primary storage on a secondary storage, when the primary storage includes data stored in a plurality of nodes. When at least one node or disk has failed, the method takes partial snapshot that excludes the failed node or disk. A diff file is created by the differences between the partial snapshot and a snapshot taken immediately prior to the failure. The diff is applied to the replica. When the failed node or disk comes back online, the method takes a snapshot prior to allowing any write operation. A diff file of the new snapshot is generated by comparing the new snapshot to the snapshot taken immediately prior to the failure. The new diff is applied to the replica.

18 Claims, 2 Drawing Sheets

ABILITY TO MAINTAIN RPO IN CLUSTERED ENVIRONMENT WITH FAILED NODES/DISKS

TECHNICAL FIELD

This disclosure relates to managing backup data, and more particularly, to maintaining recovery point objective when one or more nodes failed.

BACKGROUND

Clustered storage systems employ various techniques for distributing data across a set of nodes of a cluster. For example, incoming data may be divided into chunks that are distributed evenly across the set of nodes to balance storage capacity and resource utilization. It is important for an organization to be able to restore its data to a specific point in time. Organization may specify a recovery point objective (RPO), which indicates the point in time to which the systems and data must be recovered after an outage. In other words, it defines the amount of data loss that the organization can endure upon an outage.

One of the most common methodologies is to replicate the data to another data center and update the replicated data upon passage of set period of time per the RPO. A commonly used method of maintaining the replicated data proceeds by taking a snapshot of the data, generating a snap diff by identifying the differences between the current and prior snapshot, and sending the identified differences to the second data center to apply the changes to the prior snapshot. In this arrangement, if the primary storage fails, replication cannot continue. However, while the primary is down the data cannot change anyway, so there's no drawback to not having replication available.

Conversely, in a distributed environment, such as VSO (Virtual Scale Out), data that belongs to a logical set (aka mtree) is distributed across multiple nodes. If a node is down, data residing on that node is not available but the rest of the data in that logical set residing on other nodes in the cluster is available for access. Consequently, the primary can continue to serve data and new data can be ingested, which is one of the fundamental benefits of the VSO architecture.

On the other hand, while the primary can continue to serve data, if a node is down when it is time to replicate, snapshot creation will fail as not all of the data belonging to a logical set is available. Hence, backup can't be synced to primary, impacting the RPO of the system and the data is no longer protected to the policy level. In a cluster of tens or hundreds of node, a few nodes being down would impact the overall data protection from disaster, as replication cannot proceed. Accordingly, there is a need to improve replication process in a distributed environment.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figures 1, 2, 3, 4, 5:
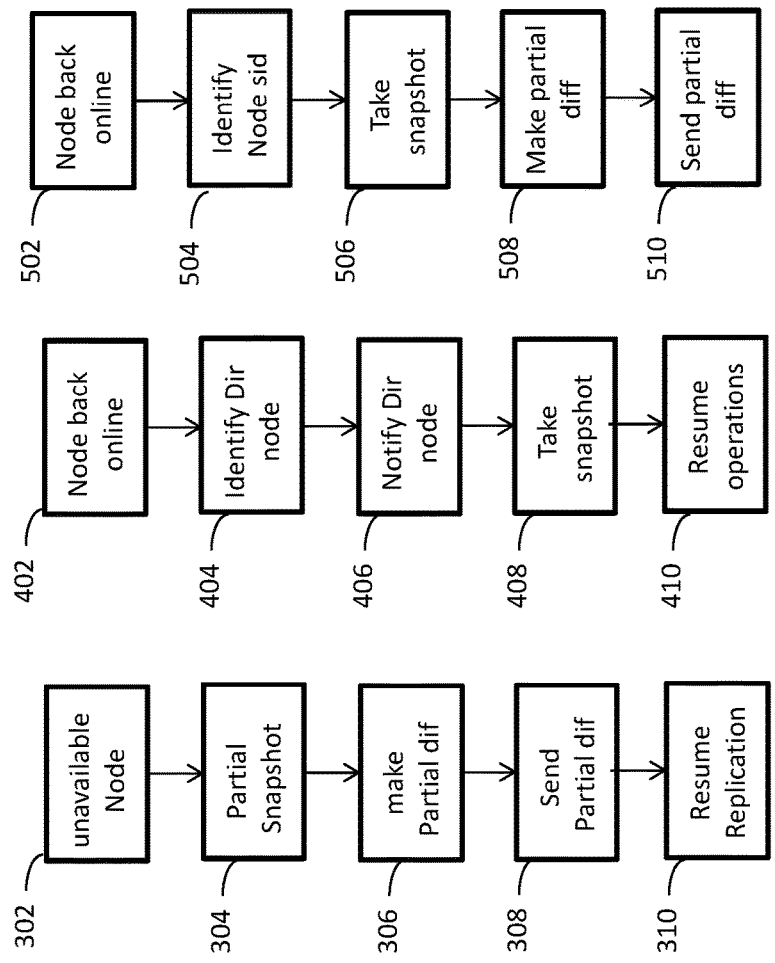
FIG. 1 is a block diagram illustrating an example operating environment for maintaining PRO in a distributed environment.
FIG. 2 is a flow chart illustrating a replication process according to one or more embodiments of the disclosure.
FIG. 3 is a flow diagram illustrating partial replication according to one or more embodiments of the disclosure.
FIG. 4 is a flow chart illustrating an example of a process for failed node joining on line according to one or more embodiments of the disclosure.
FIG. 5 is a flow chart illustrating an example method of partial snapshot for rejoining node according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system and method that maintains replication availability when a node in a clustered or distributed storage environment fails. To provide such a capability, the system performs replication process on the data that is available, thus providing a valid snapshot for partial data that is available. Note that at this point, the data in the down node cannot change since it is not available for writing either. When the node returns online, prior to allowing any write operation, a snapshot with the data of the newly joined node is obtained. Upon completing the update relating to the rejoined node, the entire snapshot is current and VSO is restored.

More particularly, in some embodiments, the system may execute a replication process as follows. When one or more nodes are unavailable, a snapshot of the mtree/filesystem among the nodes that are available is taken. This is a partial snapshot of mtree/filesystem. At this time the system keeps track of the nodes that are down or not available.

Since not all the data is available, obtaining a diff is not straight forward as diff doesn't know about file location as it's a snapshot diff of metadata. In one embodiment this is resolved by location aware diff, where the snapshot diff only looks at parts of the filesystem of the data sources that are available and are part of the partial snapshot taken. Once the difference is identified, the data is sent to the replica while identifying that the diff and snapshot are partial.

The replica then constructs a file system with mix files from different snapshots: files from available nodes that were update using the received diff, and files from the unavailable nodes that were not updated. Even though the files are from different snapshot generations, the namespace will be consistent on the replica node. Every file name entry on the replica will refer to a valid inode on the replica.

When the down node comes up, prior to allowing any write operation, the system repeats the creation of snapshot. Since this has to be done before any write occurs to that portion of the filesystem, this process should be part of filesystem/mtree recovery. Once the snapshot is created, the diff is formed again, but only for the partial snapshot that was previously unavailable. The diff is then sent to the destination and the metadata updated accordingly reflecting the snapshot.

FIG. 1 illustrates an example of environment utilizing disclosed embodiments. A server 100 is accessed by a user terminal 105. A generated backup is stored in primary backup appliance 110. A replica of the backup is stored in a secondary backup appliance 115. The replica is stored in the form of a full backup updated by subsequent diff files generated from snapshots of the primary backup appliance 110.

In this embodiment, a distributed file system is employed, such that the data in the primary backup appliance 110 spans multiple nodes. The file system metadata has information about the directory structure—this information is only on the meta node of the mtree. The file system also has references to inode structures for filenames in the mtree, which is also on the meta node. For files that are placed on remote nodes, this is a cached copy on the metadata node. Additionally, the file system has information about the inode structures on the remote node. These are inode structures for the files owned by that node.

The following provides an example wherein the file system spans two nodes. Node1 has deduplication file system (collection partition) cp1 and node2 has collection partition cp2. In this particular example, node1 is the meta node and node 2 is one of the remote nodes. A sample metadata for such a file system may be:

CP1 Btree file:
Dir1 16:16:cp1:<inode_blob>
File1 16:20:cp1:<inode_blob>
Dir2 16:22:cp1:<inode_blob>
File2 22:23:cp1:<inode_blob>
File3 22:24:cp2:<cache_inode>
File4 22:25:cp2:<cache_inode>
CP2 Btree file:
24 <inode_blob>
25 <inode_blob>

The namespace node (cp1) keeps the information of directory/file names, the corresponding parent/child inode numbers, the node (cp) in which the inode is placed, and the inode blob. The remote node (cp2) keeps information about the inode number and the inode blob.

The process of taking a snapshot, will save a point in time image of the btree files in meta node and the remote node. Unlike the prior art, in disclosed embodiments when a node or a disk fails, replication proceeds by taking a (partial) snapshot of the mtree/filesystem among the nodes that are available. Also, the system keeps track of the nodes that are not available. The diff is generated only for the available files/folders and is sent to the replica with an indication that it is only a partial snapshot. Each snapshot is identified by a snapshot ID (sid) which increments with the progression of snapshots taken. In this way, when a failed node comes back online, its last sid can be compared to the current sid to determine how many snapshot cycles it missed.

Turning back to the above example, if node cp2 is down, the snapshot will skip saving the point in time image of btree file in cp2 and the diff would skip all files related to cp2. This will make sure that the replica node that receives the diff will have all the changes that had happened on the nodes that are up and will skip all the changes that are on the nodes that are down. If all the changes till snapshot 'n' had been propagated to the replica and if cp2 failed on snapshot n+1, the changes for files placed in cp2 will not be send to the replica. This will make the replica construct a file system with a mix of files from snapshot n (with files from all cps that were down) and files from snapshot n+1 (with files from all cps that were up). Even though the files are from different snapshot generation, the namespace will be consistent on the replica node. Every file name entry on the replica will refer to a valid inode on the replica. At this point, the data that would be missing is any changes (if any) made on files in cp2 from the time of snapshot n to the time of failure.

When the down node comes up, prior to allowing any write to that node, the partial replication must be updated. When the node comes back online, it needs to check two things: first, it checks for the parent directory to indicate that it is back online and the files on that node are now accessible. Second, it check the sid of its last snapshot to determine how many snapshot generation it missed while being offline. A snapshot is then created and the diff is done again, but only for the missing part of the prior partial snapshot. The "rework" diff is sent to the destination and the metadata is updated accordingly reflecting the snapshot.

In the previous example, the snapshot n+1 will be constructed on cp2 when cp2 comes up—before any new writes can happen in cp2. A diff between all files for cp2 will be done between snapshot n and snapshot n+1 and the deltas will be sent to the replica. At this time all files in replica will be of snapshot 'n+1'. In this manner, the data that was missing from the time of snapshot n to the time of failure is recaptured.

FIG. 2 is a flow chart illustrating a process for replication. The process can be executed periodically to maintain the recovery point objective of the particular institution. The RPO policy is designed to minimize data loss upon failure of the system. At the start of the period, at 202 the system attempts to replicate the image of the primary backup appliance 110 in a secondary storage 115. At 204 the directory in the node that stores the namespace is interrogated to determine where all the files are stored at. At 206 an attempt is made to take a snapshot according to the namespace. At 208 if the attempt is successful, it means that all of the relevant nodes are operating properly and the process proceeds to 210 to make the diff file, which stores the differences between the current snapshot and the immediately preceding snapshot. Conversely, if the snapshot attempt fails, it means that one of more of the relevant nodes are offline. The process then proceeds to 212 to perform the partial snapshot procedure.

A partial snapshot procedure is illustrated in FIG. 3. When at 302 it is determined that at least one node is not available, at 304 the system takes a snapshot of the relevant nodes that are available, while making a record of the nodes that were not available. At 306 a partial diff file is created by including the differences from the current snapshot to the immediately preceding snapshot, but only for nodes that are currently online. At 308 the partial diff file is sent to the secondary storage, indicating that it is a partial diff. The secondary storage applies the partial diff as received. At 310 the system reverts to counting the time according to the RPO policy.

FIG. 4 illustrate a process executed by the system when a node comes back online. At this point, the node includes data corresponding to the snapshot taken immediately preceding the time when the node failed, with possibly additional changes that were made from the time of the snapshot to the time of failure. No further changes were made after the time of failure. Thus, the system needs to capture the changes that were made prior to the failure.

In 404 the node checks its files and identifies the parent directory node for each of the files within the failed node. At 406 the node notifies each of the directory nodes that it is back online and it has files that need to be updated in the secondary storage. At 408 a snapshot is taken of the failed node prior to allowing any write operations. After the snapshot is taken, at 410 the node may resume normal operations.

FIG. 5 illustrates a process executed by the system when a failed node comes back online. When at 502 the directory node is notified that a node is back online, the sid number of the snapshot taken immediately preceding the failure is identified at 504. At 506 a snapshot of the failed node is taken, which corresponds to step 408 in FIG. 4. At 508, a partial diff is generated using the current snapshot at the snapshot identified by the sid number of step 504. At 510 the partial diff is sent to the secondary storage.

Figure 6:
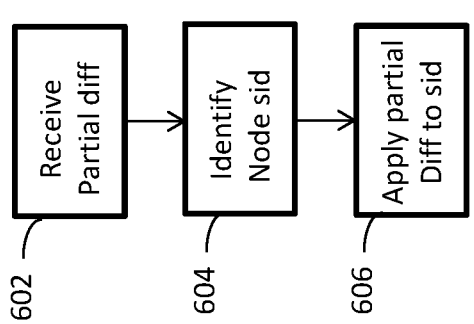
FIG. 6 is a flow diagram illustrating an example method of updating snapshot according to one or more embodiments of the disclosure.

FIG. 6 illustrates a process that may be executed at the secondary storage. At 602 the partial diff file sent in step 510 is received at the secondary storage. At 604 the sid number identified in step 504 is noted. At step 606 the partial diff is applied to the corresponding node and the snapshot identified by the sid number. The snapshot having sid number immediately following the sid number identified in 504 is now up to date.

Figure 7:
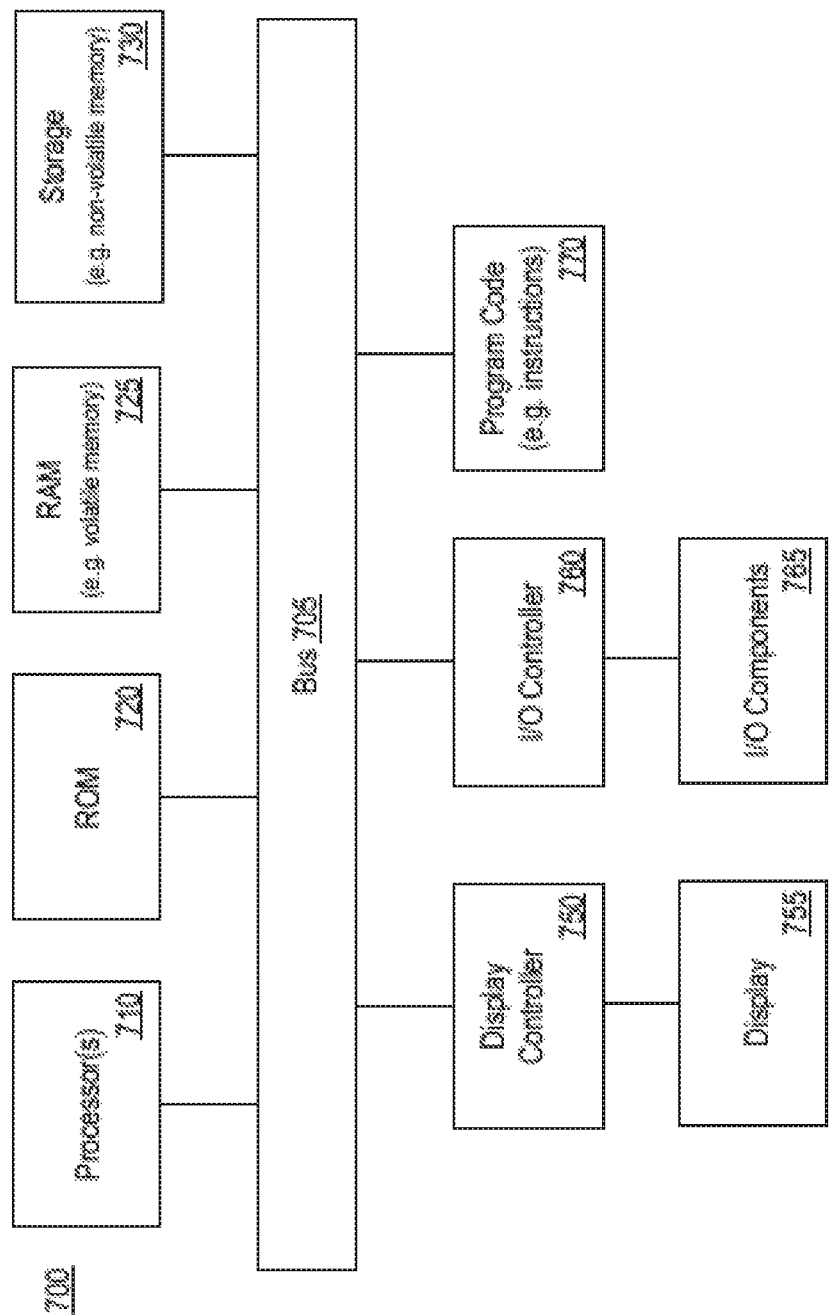
FIG. 7 is a block diagram illustrating an example of a computing system that may be used in conjunction with one or more embodiments of the disclosure.

FIG. 7 shows a block diagram of an example of a computing system that may be used in conjunction with one or more embodiments of the disclosure. For example, computing system 400 (or system, or server, or computing device, or device) may represent any of the devices or systems (e.g. backup component 150, clustered storage system 180, storage node 212, etc.) described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 705 which may be coupled to a processor 710, ROM (Read Only Memory) 720, RAM (or volatile memory) 725, and storage (or non-volatile memory) 730. The processor(s) 710 may retrieve stored instructions from one or more of the memories 720, 725, and 730 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 710 may perform operations in an on-demand or "cloud computing" environment or as a service (e.g. within a "software as a service" (SaaS) implementation). Accordingly, the performance of operations may be distributed among the one or more processors 710, whether residing only within a single machine or deployed across a number of machines. For example, the one or more processors 710 may be located in a single geographic location (e.g. within a home environment, an office environment, or a server farm), or may be distributed across a number of geographic locations. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g. accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 may represent any of the instructions, applications, software, libraries, toolkits, modules, components, engines, units, functions, logic, etc. as described herein (e.g. backup component 150). Program code 770 may reside, completely or at least partially, within the memories described herein (e.g. non-transitory computer-readable media), or within a processor during execution thereof by the computing system. Program code 770 may include both machine code, such as produced by a compiler, and files containing higher-level or intermediate code that may be executed by a computing system or other data processing apparatus (or machine) using an interpreter. In addition, program code 770 can be implemented as software, firmware, or functional circuitry within the computing system, or as combinations thereof. Program code 770 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified. Reference to ordinal numbers such as "first," "second," "third," etc. may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   a primary storage having data stored in a plurality of nodes;
   a secondary storage storing a replica of the primary storage;
   one or more processors; and
   a non-transitory computer readable medium storing a plurality of instructions, which when executed, cause the one or more processors to:
   periodically update the replica and when it is determined that at least one of the plurality of nodes is offline, performing the steps:
   taking a partial snapshot of the primary storage excluding offline node;
   forming a partial diff file by comparing the snapshot to immediately preceding snapshot;
   sending the partial diff file to the secondary storage.

2. The system of claim 1, wherein the plurality of instructions, when executed, further cause the one or more processors to apply the partial diff file to the replica.

3. The system of claim 2, wherein the plurality of instructions, when executed, further cause the one or more processors to:
   store identification of the offline node.

4. The system of claim 3, wherein the plurality of instructions, when executed, further cause the one or more processors to:
   when receiving an indication that the offline node is operational, performing the steps:
   identify directory node in the primary storage;
   notify directory node that offline node is operational.

5. The system of claim 4, wherein the plurality of instructions, when executed, further cause the one or more processors to:
   when receiving notification that offline node is operational performing the steps:
   taking node snapshot of the offline node;
   generating a node diff file by comparing the node snapshot to the partial snapshot;
   sending the node diff file to the secondary storage.

6. The system of claim 5, comprising:
   wherein the plurality of instructions, when executed, further cause the one or more processors to apply the node diff to the replica.

7. In a system having a primary storage having data stored in a plurality of nodes and a secondary storage storing a replica of the primary storage, a computer implemented method comprising:
   periodically update the replica and when it is determined that at least one of the plurality of nodes is offline, performing the steps:
   taking a partial snapshot of the primary storage excluding offline node;
   forming a partial diff file by comparing the snapshot to immediately preceding snapshot;
   sending the partial diff file to the secondary storage.

8. The method of claim 7, further comprising applying the partial diff file to the replica.

9. The method of claim 8, further comprising storing identification of the offline node.

10. The method of claim 9, further comprising when receiving an indication that the offline node is operational, performing the steps:
    identifying directory node in the primary storage;
    notifying directory node that offline node is operational.

11. The method of claim 10, further comprising
    when receiving notification that offline node is operational performing the steps:
    taking node snapshot of the offline node;
    generating a node diff file by comparing the node snapshot to the partial snapshot;
    sending the node diff file to the secondary storage.

12. The method of claim 11, further comprising applying the node diff to the replica.

13. A computer program product comprising a non-transitory computer-readable medium having a computer-readable program code embodied therein to be executed by one or more processors, the program code including instructions to:
    periodically update a replica of a primary storage in a secondary storage, the primary storage having a plurality of nodes;
    when it is determined that at least one of the plurality of nodes is offline, performing the steps:
    taking a partial snapshot of the primary storage excluding offline node;
    forming a partial diff file by comparing the snapshot to immediately preceding snapshot;
    sending the partial diff file to the secondary storage.

14. The computer program product of claim 13, wherein the program code includes further instructions to apply the partial diff file to the replica.

15. The computer program product of claim 14, wherein the program code includes further instructions to store identification of the offline node.

16. The computer program product of claim 15, wherein the program code includes further instructions to: when receiving an indication that the offline node is operational, performing the steps:
    identify directory node in the primary storage;
    notify directory node that offline node is operational.

17. The computer program product of claim 16, wherein the program code includes further instructions to: when receiving notification that offline node is operational performing the steps:
    taking node snapshot of the offline node;
    generating a node diff file by comparing the node snapshot to the partial snapshot;
    sending the node diff file to the secondary storage.

18. The computer program product of claim 17, the program code including instructions to apply the node diff to the replica.

* * * * *